Oct. 6, 1931.  F. STREICH  1,826,031
DOUGH DIVIDER
Filed Dec. 24, 1930  3 Sheets-Sheet 1

Inventor,
Frank Streich,
by Charles O. Shurvey
his Atty.

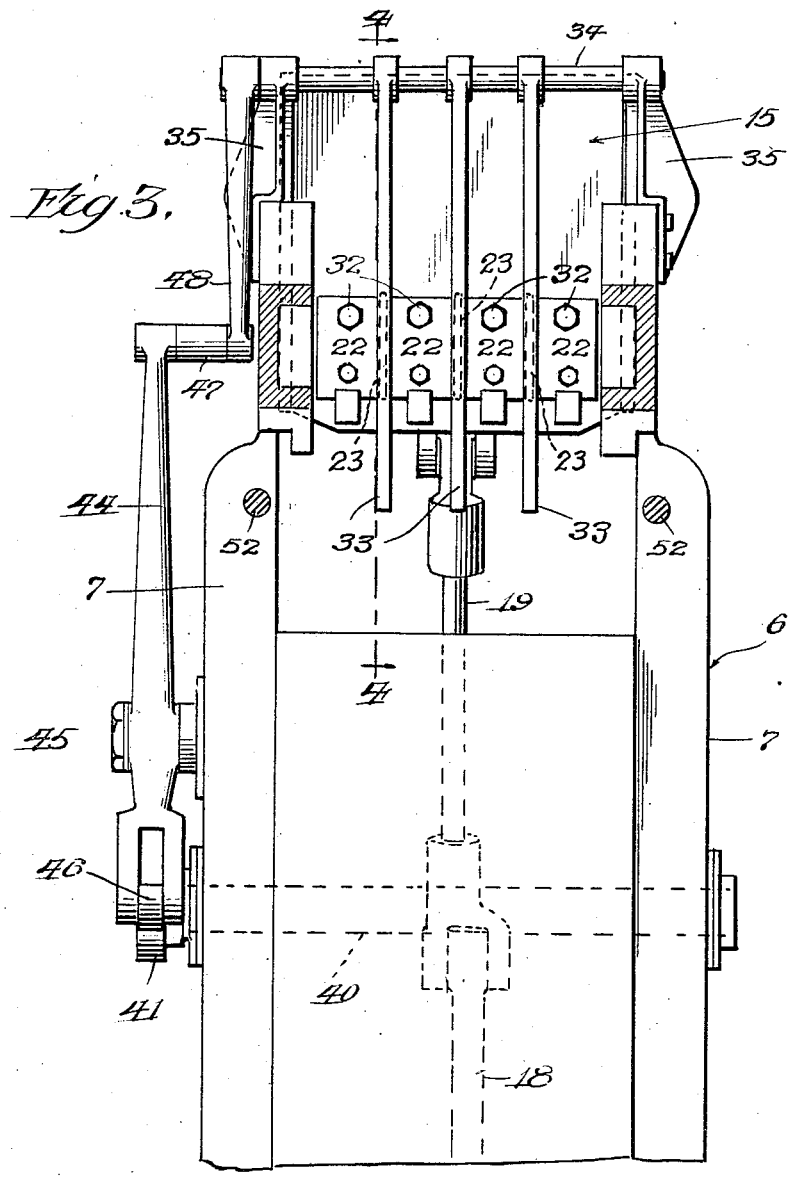

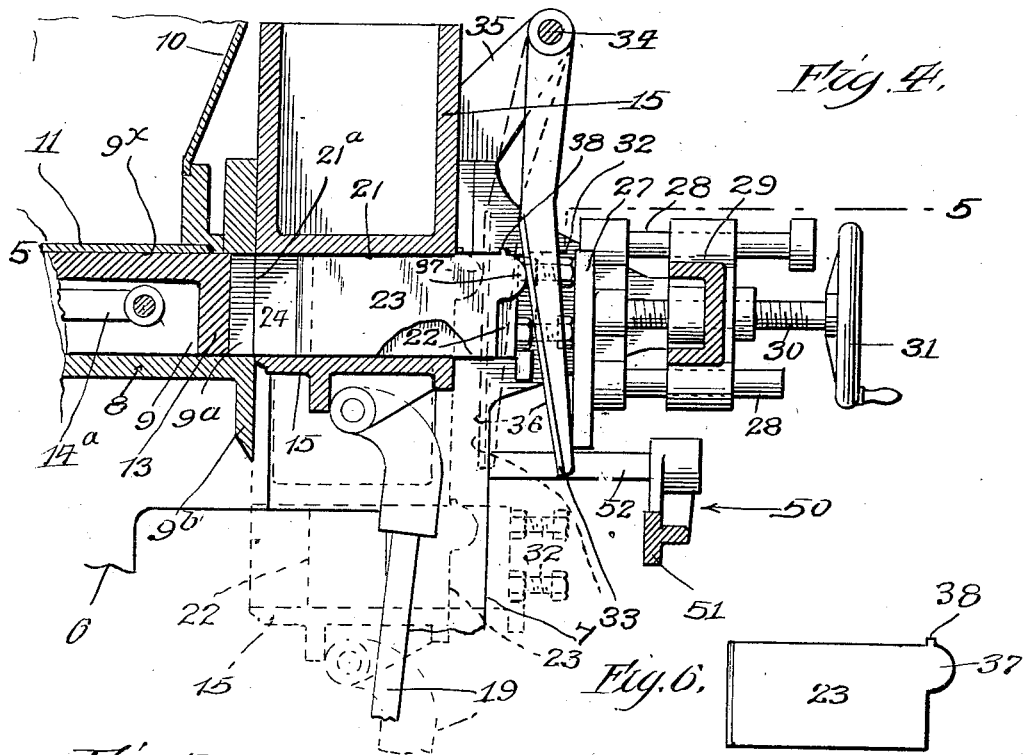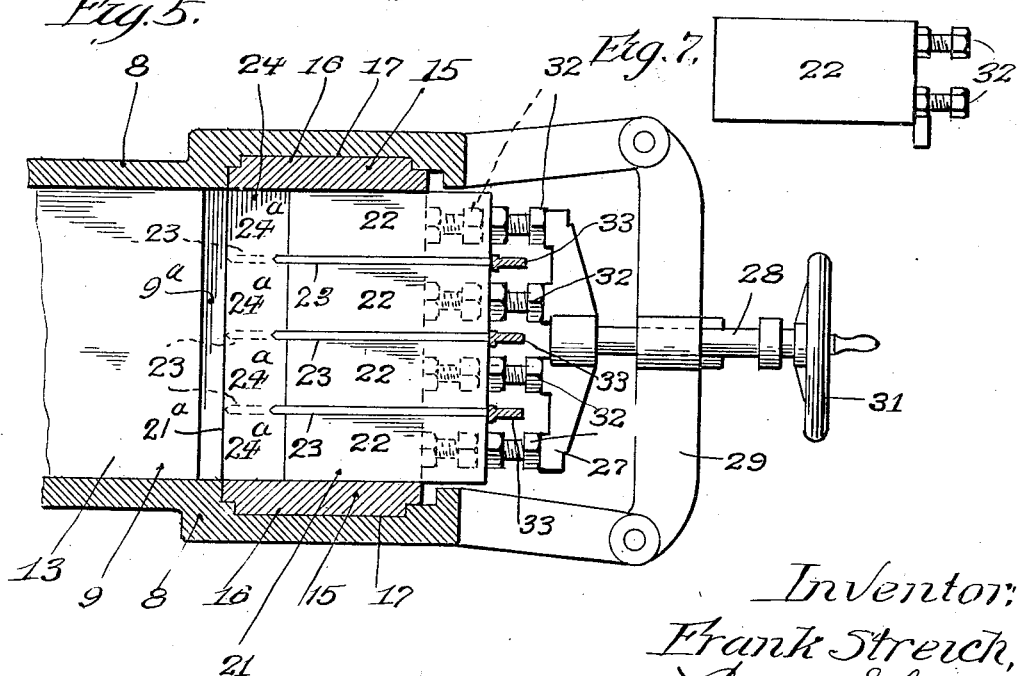

Patented Oct. 6, 1931

1,826,031

UNITED STATES PATENT OFFICE

FRANK STREICH, OF JOLIET, ILLINOIS, ASSIGNOR TO UNION MACHINERY COMPANY, OF JOLIET, ILLINOIS, A CORPORATION OF ILLINOIS

DOUGH DIVIDER

Application filed December 24, 1930. Serial No. 504,517.

This invention relates to dough dividers, and its principal object is the provision of novel means for accurately dividing a relatively large lump of dough into a number of smaller lumps of uniform size and weight. The invention relates more particularly to that type of dough dividers in which the dough is forced into a pocket by a plunger and the dough thereafter discharged from the pocket. In some cases individual pockets are provided for measuring lumps of dough, and in some cases a large pocket is provided and the large lump divided into smaller lumps when being discharged from the pocket. The present invention has particular reference to dough dividers in which the dough is divided into individual lumps in the pocket.

In accordance with the present invention, the dough is forced into a pocket of sufficient capacity to receive enough dough for several loaves of bread or for several buns, the entire mass being subject to an equal pressure throughout, and said large lump is cut or divided, while in the pocket, into the individual smaller lumps of given size and weight to produce the loaves of bread or buns. A particular advantage which is gained by dividing the dough, while in the pocket under compression, is uniformity in size and weight, which is of the utmost importance and cannot be obtained consistently with dividers now in common use.

The invention consists, therefore, in a dough divider having a measuring pocket for receiving a charge of dough and dough ejecting plungers separated by dough cutting or dividing members slidably mounted therein, the latter being movable independently of the plungers to sever the charge of dough into individual measured lumps before being discharged from the pocket. It further consists in means for actuating said dough cutting or dividing members while the dough is contained in the pocket under compression.

It further consists in the several novel features of construction, arrangement and combination of parts hereinafter fully set forth and claimed.

The invention is clearly illustrated in the accompanying drawings in which—

Fig. 3 is a detail view, partly in end elevation and partly in cross section, taken on the line 3—3 of Fig. 1;

Fig. 4 is a vertical longitudinal section taken on the line 4—4 of Fig. 3;

Fig. 5 is a detail horizontal section taken on the line 5—5 of Fig. 4;

Fig. 6 is a detail side elevation of one of the dough dividing members; and

Fig. 7 is a detail side elevation of one of the ejecting plungers.

Figure 1:
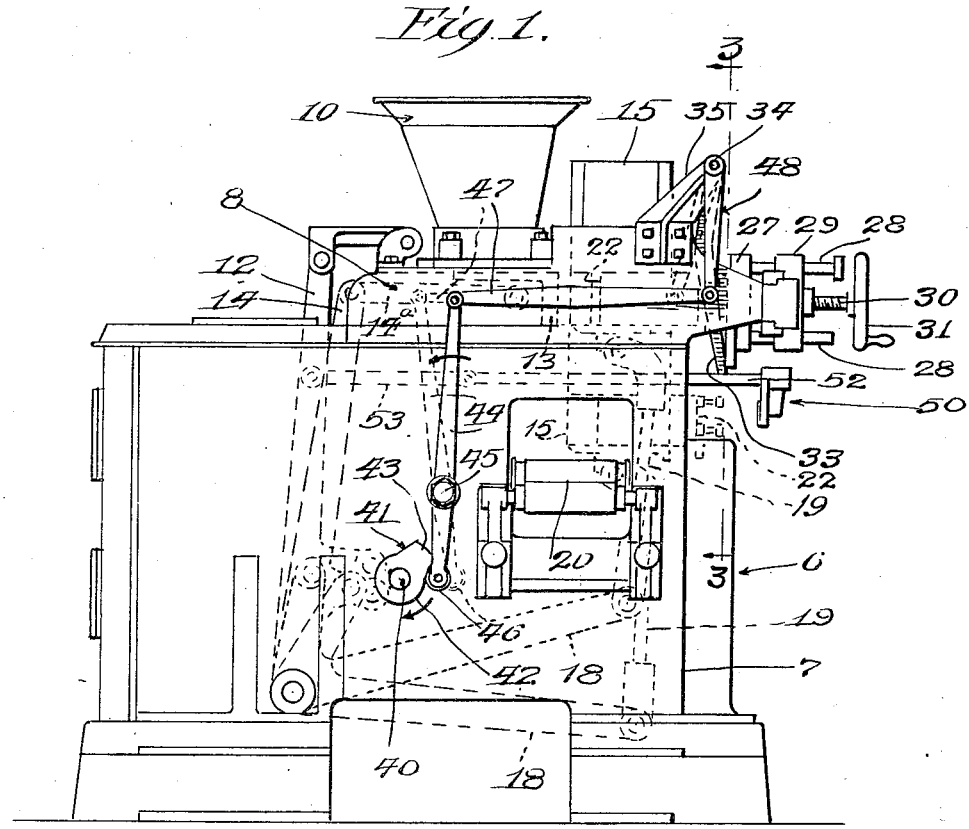
Figure 1 is a side elevation of a dough divider embodying a simple form of the present invention.

Referring to said drawings, which illustrate one form of the present invention, the reference character 6 designates the main frame of a dough divider of the type shown and described in my prior patent on dough dividers, No. 1,757,099, dated May 6, 1930, to which reference is hereinafter made. The main frame 6 is usually composed of two side frame members 7 which carry the operating mechanism of the machine.

At the top of said side frame members is a housing 8 in which is contained a charging or dough receiving chamber 9 having an opening 9ˣ in its upper side through which dough is taken into the charging chamber from a hopper 10 located above said opening and secured to the housing 8. The opening or passage 9ˣ between the hopper and charging chamber is controlled by a reciprocating knife or plate 11, as is customary in dividers of this type, and said knife or plate 11 is actuated by a cam operated lever 12 in timed relation to a charging plunger 13 contained in the charging chamber and operating to force the dough into the measuring pocket as hereinafter explained. A cam operated lever 14 connected to said plunger 13 by a link 14ª operates to reciprocate the plunger. All of the parts above described are more fully shown and described in my said prior patent.

Figure 2:
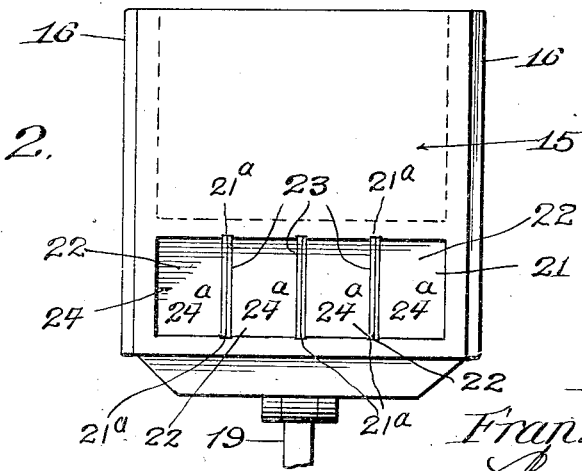
Fig. 2 is an end elevation of the head or carrier which contains the measuring pocket.

Beyond the discharge end 9ˣ of the charging chamber 9, the housing 8 is arranged to receive a vertically reciprocating head or carrier 15 (see Fig. 2), which, in the present instance, is substantially rectangular in form and is provided with vertical ribs 16 on its sides which slide in ways 17 formed on the inner faces of the housing 8. A cam operated lever 18 connected to the head or carrier 15 by a link 19 operates to reciprocate the head or carrier vertically in timed relation to the charging plunger 13, so that after a charge of dough has been forced into the head or carrier, it is moved down into a second or discharging position, where the contents are ejected from the head or carrier. An apron or belt 20, trained around suitable rollers or pulleys and driven by any suitable means, is located below the head or carrier in position to receive the divided contents when discharged therefrom and carry the same to one side of the machine where a conveyor or belt (not shown) is provided to carry the lumps of dough to another machine for a subsequent operation. For a fuller description of the parts above described, reference may be had to my above mentioned patent.

The head or carrier contains a transversely extending cavity or hollow space 21 which corresponds in cross section to the cross section of the charging chamber 9 and forms a continuation thereof when the head occupies its upper or dough receiving position (see Figs. 4 and 5). Slidably mounted in the cavity 21 are several dough ejecting plungers 22 arranged side by side and spaced apart by movable dough cutting or dough dividing members or knives 23, the plungers and dough dividing members completely filling the space between the side of the cavity 21 and the top and bottom thereof and forming the end wall of a measuring pocket 24 when moved back in the cavity. The measuring pocket comprises the space between the top, bottom and side walls of the cavity 21, and the forward end faces of the plungers and forward edges of the dough dividing members. The dough dividing members 23 are preferably guided for endwise movement in grooves 21ª formed in the top and bottom walls of the cavity 21 (see Fig. 2) to prevent side play of the dough dividing members, which play might interfere with their accuracy in dividing the dough.

It is to be understood that at the commencement of the charging operation, the plungers and dough dividing members occupy the forward position indicated by the dotted lines in Fig. 5 with the forward end faces of the plungers and forward edges of the dough dividing members coincident with the receiving end 21ª of the cavity 21, and that as the dough is forced against the plungers and dough dividing members, the plungers and dough dividing members are forced back thereby until they are arrested by certain stop members, thus forming in the cavity 21 a dough measuring pocket 24 of the correct capacity to receive, under pressure, the exact amount of dough required to be divided into the number of lumps of dough corresponding to the number of plungers used (four being shown in the drawings). Projecting down from the discharge end 9ª of the charging chamber 9 is a wall 9ᵇ (see Fig. 4) which closes the front end of the cavity 21 in the head while the latter is moving between its two positions.

Behind the ejecting plungers 22 is a scale plate or abutment member 27 carried by rods 28 slidably mounted in a cross member 29 mounted on the frame of the machine, and said scale plate or abutment member 27 is adjustable toward and away from the ejector plungers 22 by a screw 30 threaded in the cross member 29 and rotatably connected with the scale plate 27. A hand wheel 31 on the outer end of the screw 30 provides means for manipulating the latter and adjusting the scale plate.

Projecting from the rear ends of the ejector plungers are studs 32 which are locked in place by lock nuts, and are adapted to strike against the scale plate 27 at the end of the charging strokes of the ejecting plungers to thereby precisely determine the depth of the measuring pocket and consequently its capacity. By adjusting the scale plate, a greater or lesser depth of the measuring pocket may be obtained.

Behind each knife or dough dividing member 23 is an oscillatory knife actuating arm 33 carried by a rock shaft 34 mounted in brackets 35 carried by the frame of the machine. Each arm 33 has a straight front face 36 which in one position of the arm, stands upright (see dotted lines in Fig. 4), and this is the position occupied by the arms 33 at the commencement of the charging operation of the charging plunger 13, also when the charge of dough in the measuring pocket has been divided into individual measured lumps. The arms 33 are capable of swinging back into the solid line position seen in Fig. 4, and the knives or dough dividing members 23 are arranged to engage and swing back the arms 33 as the knives 23 are moved back by the dough while it is being forced into the measuring pocket.

Conveniently, the knives or dough dividing members 23 are provided with humps or rounded lugs 37 (see Fig. 4) on their rear edges which engage the straight faces of the arms 33, and shoulders 38 are provided on the knives or dough dividing members 23 in position to engage the rear wall of the head 15 when their front edges come into alignment with the front end of the measuring pocket. In other words, the shoulders act to gauge the inward stroke of the knives or dough dividing members 23. The arms 33 are free during the charging operation of the charging plunger 13 to swing back a distance limited by the scale plate.

From the above it will be understood that the entire measuring pocket, defined by the walls of the cavity 21 and end faces and edges of the ejecting plungers 22 and knives or dough dividing members 23, is filled with a charge of dough each time the charging plunger 13 is moved forward to fill the pocket, and, consequently, the mass of dough is distributed evenly throughout the pocket. Means are provided for moving the knives or dough dividing members 23 forward through the charge of dough while it is under compression in the pocket, thereby severing or dividing the charge of dough contained therein into individual lumps of equal size and weight, and said means will now be described.

Mounted on the shaft 40, which is the main or cam shaft of the machine and which carries the cams that actuate the knife or plate 11, the charging plunger 13 and the head 15 in timed relation to each other, is a cam 41 which contains a concentric face 42 and a nose 43. Co-operating with the cam 41 is a lever 44 fulcrumed between its ends on the frame of the machine, as at 45, and having a roller 46 at the lower end of one arm that rides upon the cam 41. The upper end of the other arm of the lever 44 is connected by a link 47 to an arm 48 which is fast on one end of the rock shaft 34 that carries the oscillatory knife actuating arms 33. The cam 41 is set in timed relation to the other cams, so that its nose will encounter the roller 46 after the measuring pocket has been completely filled and while the dough is under compression in the pocket, and thereby swing the lever 44 over in the direction indicated by the arrow in Fig. 1, and, as a consequence, swing the knife actuating arms 33 from the solid line position, seen in Fig. 4, to the dotted line position indicated therein, thus sliding the knives or dough dividing members 23 forward through the charge of dough in the measuring pocket and separating or dividing the charge of dough into individual lumps of dough while in the pocket. This forward position of the knives or dough dividing members 23 is shown by the dotted lines in Fig. 5 and in effect this position of the knives or dough dividing members 23 divides the measuring pocket into several individual measuring pockets 24ª adapted to contain measured lumps of dough of equal size and weight.

As has been explained, the head 15 with the measured lumps of dough contained in the individual pockets 24ª is moved down into a second position where the lumps of dough are discharged from the individual pockets 24ª, and during a portion of this downward movement of the head, the arms 33 are held against the knives 22 by the engagement of the nose of the cam 41 with the roller 46 of the lever 44. As in the machine of my prior patent above referred to, an ejector 50 is provided which may be in the form of a bar 51 carried by rods 52 slidably mounted in the frame of the machine, and at least one of them connected by a link 53 to and actuated by the lever 12, in timed relation to the other mechanism so as to engage the studs 32 and push the ejector plungers 22 forward and thereby eject or discharge the lumps of dough from the individual pockets 24ª and deliver them upon the apron 20.

It is believed that the operation of the mechanism forming the subject matter of the present invention is clear from the above description; briefly, the dough is drawn into the charging chamber 9 from the hopper 10 and forced against the ejector plungers 22 and knives 23 and into the measuring pocket 24 during the interval that the head occupies its upper or receiving position. At the commencement of the charging operation the plungers 22 and knives 23 occupy their forward position closing the cavity to the pocket, having theretofore been moved to such position by the arms 33 and ejector 50, as above explained.

Before the charging plunger 13 moves forward, the knife or plate 11 is moved across the passage between the hopper and charging chamber. As the charging plunger 13 moves forward, it forces the dough against the ejecting plungers 22 and knives 23 pushing them back to their limit of movement, and, at the same time, filling the measuring pocket. It is understood that the dough is placed under pressure in the measuring pocket by the charging plunger.

After the measuring pocket has been filled, the nose of the cam 41 engages the roller 46 and swings back the lever 44 and through the link 47, arm 48 and rock shaft 34 swings the knife actuating arms 33 forward, thereby forcing the knives 22 through the mass of dough in the measuring pocket and separating or dividing the same into individual lumps of equal size and weight. Before or during the forward movement of the knives 22, the lever 18 is swung down to the dotted line position shown in Fig. 1, thereby drawing down the head 15 with the divided dough therein, and as the head reaches its lowermost or discharge position, the lever 12 is swung back, thereby retracting the knife or plate 11 and moving the ejector plate 51 against the studs 32 of the ejector plungers 22 and pushing said plungers forward, thereby ejecting the individual lumps from the individual pockets 24ª from which they fall upon the apron 20 and are carried away. The lever 18 then swings upward thereby returning the head 15 to its upper or charging position with the ejector plungers 22 and knives 23 in their forward position closing the entrance to the measuring pocket, and the operation of the machine proceeds as before.

It will be seen that in the present machine the charge of dough contained in the measuring pocket is divided therein into individual lumps by movable dough dividing members which cut through the mass of dough that is held under equal pressure throughout, and, as a consequence, accuracy is obtained both in size and weight of the loaves which is so essential in this class of machinery.

More or less variation of the exact details of construction is possible without departing from the spirit of this invention. I desire, therefore, not to limit myself to the exact form of the construction shown and described, but intend, in the following claims to point out all of the invention disclosed herein.

I claim as new, and desire to secure by Letters Patent:

1. In a dough divider, the combination of a charging chamber, a charging plunger therein, a carrier movable from a charging position to a discharging position, and having a cavity therein adapted to receive a charge of dough from said charging chamber and in which slide a plurality of ejector plungers separated by slidable dough dividing members, said plungers and dough dividing members forming an end wall of said cavity, and means for moving said dough dividing members forward through a charge of dough contained in said cavity.

2. In a dough divider, the combination of a charging chamber, a charging plunger therein, a carrier movable from a charging position to a discharging position, and having a cavity therein adapted to receive a charge of dough from said charging chamber under pressure, a plurality of ejector plungers and interposed dough dividing members sliding in said cavity and forming a movable end wall therefor having a predetermined limit of movement, and means for moving said dough dividing members forward through a mass of dough contained in said cavity.

3. In a dough divider, the combination of a charging chamber, a charging plunger therein, a carrier movable from a charging position to a discharging position, and having a dough receiving pocket, for receiving dough from said charging chamber, said pocket having an end wall formed by endwise movable ejecting plungers and interposed dough dividing members, the latter being adapted to be moved forward through the mass of dough contained in the pocket and thereby divide the same into lumps of equal size and weight.

4. In a dough divider, the combination of a charging chamber, a charging plunger therein, a carrier movable from a charging position to a discharging position, and having a pocket for receiving dough from said charging chamber provided with a receding and advancing end wall made in sections, certain of which are capable of advancing independently of the others and thereby dividing the mass of dough in the pocket into smaller masses of equal size and weight.

5. In a dough divider, the combination of a charging chamber and a charging plunger therein, a reciprocating head having a cavity therein adapted, in one position of the carrier, to coincide with the end of the charging chamber, ejecting plungers in said cavity and dough dividing members interposed between said ejecting plungers, said ejecting plungers and dough dividing members providing a receding end wall for said cavity, whereby the charging plunger may force a charge of dough into said cavity, and means for advancing said dough dividing members through said dough while under pressure exerted by said charging plunger, whereby the charge of dough is divided into smaller individual lumps.

6. In a dough divider, the combination of a charging chamber, and a charging plunger therein, a reciprocating head having a cavity therein adapted, in one position of the carrier, to coincide with the end of the charging chamber, ejecting plungers in said cavity and dough dividing members interposed between said ejecting plungers, said ejecting plungers and dough dividing members providing a receding end wall for said cavity, whereby the charging plunger may force a charge of dough into said cavity, oscillatory arms engaging said dough dividing members and adapted to move them through the charge of dough while under pressure exerted by the charging plunger, and means for oscillating said arms.

7. In a dough divider, the combination of a charging chamber, and a charging plunger therein, a reciprocating head having a cavity therein adapted, in one position of the carrier, to coincide with the end of the charging chamber, ejecting plungers in said cavity and dough dividing members interposed between said ejecting plungers, said ejecting plungers and dough dividing members providing a receding end wall for said cavity, whereby the charging plunger may force a charge of dough into said cavity, oscillatory arms engaging said dough dividing members and adapted to move them through the charge of dough while under pressure exerted by the charging plunger, and cam operated means for oscillating said arms.

8. In a dough divider, the combination of a charging chamber, and a charging plunger therein, a reciprocating head having a cavity therein adapted, in one position of the carrier, to coincide with the end of the charging chamber, ejecting plungers in said cavity and dough dividing members interposed between said ejecting plungers, said ejecting plungers and dough dividing members providing a receding end wall for said cavity, whereby the charging plunger may force a charge of dough into said cavity, swinging means for advancing said dough dividing members in advance of the ejecting plungers, whereby the charge of dough is divided into individual lumps while in said cavity, and means for actuating said swinging means.

9. In a dough divider, the combination of a charging chamber and a charging plunger therein, a reciprocating head having a cavity therein adapted, in one position of the carrier, to coincide with the end of the charging chamber, ejecting plungers in said cavity and dough dividing members interposed between said ejecting plungers, said ejecting plungers and dough dividing members providing a receding end wall for said cavity, whereby the charging plunger may force a charge of dough into said cavity, means for advancing said dough dividing members through said dough while under pressure exerted by said charging plunger, whereby the charge of dough is divided into smaller individual lumps, and an ejector adapted to subsequently engage said ejecting plungers and therewith advance them through the cavity to thereby discharge said individual lumps therefrom.

10. In a dough divider, the combination of a charging chamber and a charging plunger therein, a reciprocating head having a cavity therein adapted, in one position of the carrier, to coincide with the end of the charging chamber, ejecting plungers in said cavity and dough dividing members interposed between said ejecting plungers, said ejecting plungers and dough dividing members providing a receding end wall for said cavity, whereby the charging plunger may force a charge of dough into said cavity, oscillatory arms engaging said dough dividing members and adapted to move them through the charge of dough while under pressure exerted by the charging plunger, means for oscillating said arms, and an ejector adapted to subsequently engage said ejector plungers and therewith advance them through the cavity to thereby discharge said individual lumps therefrom.

11. In a dough divider, the combination of a charging chamber, a charging plunger therein, a carrier movable from a charging position to a discharging position and formed with a cavity therein adapted to receive a charge of dough from said charging chamber, a plurality of spaced ejecting plungers slidably mounted in said cavity, a dough dividing member interposed between the adjacent ejecting plungers and slidable independently of said plungers in an endwise direction, and means for independently moving said dough dividing members and ejecting plungers forward in said cavity.

12. In a dough divider, the combination of a charging chamber, a charging plunger therein, a carrier movable from a charging position to a discharging position and formed with a cavity therein adapted to receive a charge of dough from said charging chamber, a plurality of spaced ejecting plungers slidably mounted in said cavity, a dough dividing member interposed between the adjacent plungers and guided independently of said plungers for endwise movement in said cavity, said plungers and dough dividing members forming a movable end wall in said cavity, and means for independently moving forward said dough dividing members and ejecting plungers.

13. In a dough divider, the combination of a charging chamber, a charging plunger therein, a carrier movable from a charging position to a discharging position and formed with a cavity therein adapted to receive a charge of dough from said charging chamber, a plurality of spaced ejecting plungers slidably mounted in said cavity, a dough dividing member interposed between the adjacent plungers, means for limiting the backward movement of said plungers and dough dividing member, and means for independently moving forward said dough dividing member and plungers.

14. In a dough divider, the combination of a charging chamber, a charging plunger therein, a carrier movable from a charging position to a discharging position and formed with a cavity therein adapted to receive a charge of dough from said charging chamber, a plurality of spaced ejecting plungers and interposed dough dividing members therebetween mounted to slide independently of each other in said cavity, means for limiting the backward movement of said ejecting plungers and dough dividing members, means for moving forward said dough dividing members while the ejecting plungers are at the limit of their backward movement, and other means for moving forward the ejecting plungers while the dough dividing members are at the forward limit of their movement.

15. In a dough divider, the combination of a charging chamber, a charging plunger therein, a carrier movable from a charging position to a discharging position and having a cavity therein adapted to receive a charge of dough from said charging chamber, a plurality of spaced ejecting plungers slidably mounted in said cavity, dough dividing members interposed between said ejecting plungers and independently guided for endwise movement in said cavity, means for limiting the backward movement of said ejecting plungers and said dough dividing members, means for moving forward said dough dividing members when the ejecting plungers are at the backward limit of their movement, and other means for moving forward the ejecting plungers.

FRANK STREICH.